United States Patent Office 3,651,062
Patented Mar. 21, 1972

3,651,062
BICYCLIC AMINES
Willy Fatzer, Flurweg 12, Bottmingen, Switzerland;
Daniel Porret, Zeigerweg 37, Binningen, Switzerland;
and Juerg Maurer, Baeumlihofstrasse 395, Riehen, Switzerland
No Drawing. Filed May 4, 1970, Ser. No. 34,534
Claims priority, application Switzerland, May 13, 1969,
7,287/69
Int. Cl. C07d 57/12
U.S. Cl. 260—256.4 F
5 Claims

ABSTRACT OF THE DISCLOSURE

Process for the manufacture of new, bicyclic amines, for example 1-(γ-aminopropyl)-9,9-dimethyl-1,3,7-triazabicyclo[4.3.0]non(7)en-2-one or 1-(γ-aminopropyl)-9-methyl-9-ethyl - 1,3,7 - triaza-bicyclo[4.3.0]non(7)en-2-one by intramolecular elimination of 1 mol of water from, for example, 1,3-di-(γ-aminopropyl)-5,5-dimethylhydantoin or 1,3 - di - (γ-aminopropyl)-5-methyl-5-ethylhydantoin. The new bicyclic amines represent valuable curing agents for epoxide resins, and furthermore a B-stage resin (precondensate) having good storage stability at room temperature can be manufactured.

---

The manufacture of monoamines and diamines which possess a hydantoin nucleus is known. Thus, Japanese patent specification No. 276,504 describes the two amines of formula

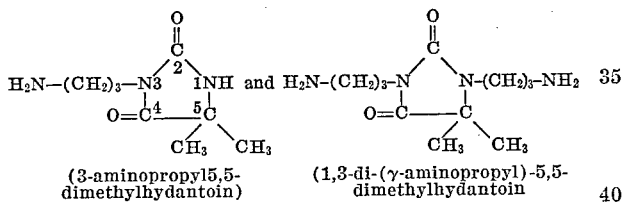

(3-aminopropyl5,5-dimethylhydantoin)    (1,3-di-(γ-aminopropyl)-5,5-dimethylhydantoin Their use as curing agents for epoxide resins is however not mentioned anywhere there, nor made obvious to the expert. Japanese patent specification No. 276,504 furthermore also describes the intramolecular elimination of water from 3 - γ - aminopropyl - 5,5 - dimethylhydantoin, whereby the compound of formula

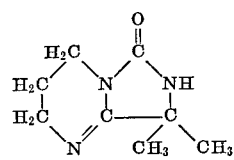

or of formula

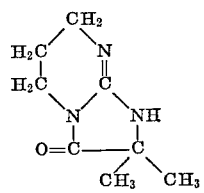

is obtained, which no longer contains a NH₂ group.

It has now been found that a valuable curing agent for epoxide compounds is obtained if, for example, one mol of water is intramolecularly eliminated from 1,3-di-(γ-aminopropyl) - 5,5 - dimethylhydantoin by heating, whereby the bicyclic amine of formula

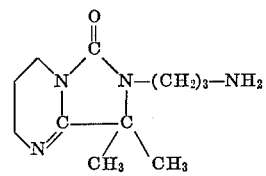

is formed.

The subject of the present invention is hence a process for the manufacture of new bicyclic amines of formula

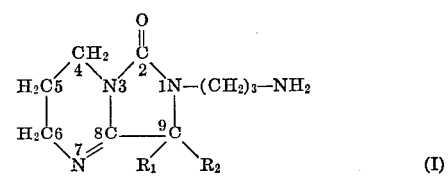

wherein $R_1$ and $R_2$ independently of one another each denote a hydrogen atom or an aliphatic or cycloaliphatic hydrocarbon radical, preferably a lower alkyl radical with 1 to 4 carbon atoms, or wherein $R_1$ nd $R_2$ together form a divalent aliphatic or cycloaliphatic hydrocarbon radical, preferably a tetramethylene or pentamethylene radical, characterised in that 1 mol of water is intramolecularly eliminated by heating from diamines of formula

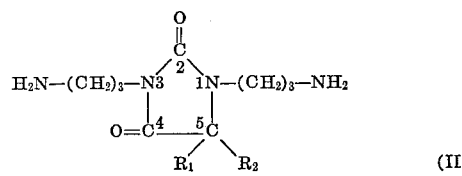

wherein $R_1$ and $R_2$ have the same significance as in Formula I.

As bicyclic amines of Formula I there may for example be mentioned:

1-(γ-aminopropyl)-1,3,7-triazabicyclo[4.3.0]non(7)-en-2-one,
1-(γ-aminopropyl)-9,9-dimethyl-1,3,7-triaza-bicyclo[4.3.0]non(7)en-2-one,
1-(γ-aminopropyl)-9-methyl-9-ethyl-1,3,7-triaza-bicyclo[4.3.0]non(7)en-2-one,
1-(γ-aminopropyl)-9,9-diethyl-1,3,7-triaza-bicyclo[4.3.0]non(7)en-2-one,
1-(γ-aminopropyl)-9-isopropyl-1,3,7-triaza-bicyclo[4.3.0]non(7)en-2-one,
1-(γ-aminopropyl-9,9-tetramethylene-1,3,7-triaza-bicyclo[4.3.0]non(7)en-2-one and
1-(γ-aminopropyl)-9,9-pentamethylene-1,3,7-triaza-bicyclo[4.3.0]non(7)en-2-one.

The di-(N-γ-aminopropyl)hydantoins or diamino compounds of Formula II used as starting substances for the intramolecular elimination of water can be conveniently manufactured by cyanoethylation of a hydantoin of Formula

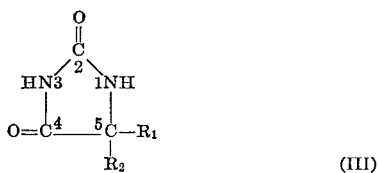

(III)

wherein $R_1$ and $R_2$ have the abovementioned significance, and subsequent catalytic hydrogenation of the resulting di-(N-β-cyanoethyl)-hydantoins in the presence of ammonia and a hydrogenation catalyst, such as for example Raney nickel or Raney cobalt.

As di-(N-γ-aminopropyl)-hydantoins or diamino compounds of Formula II there may for example be mentioned:

1,3-di-(γ-aminopropyl)-5,5'-dimethylhydantoin,
1,3-di(γ-aminopropyl)-5-methyl-5-ethylhydantoin,
1,3-di-(γ-aminopropyl)-5-methylhydantoin,
1,3-di-(γ-aminopropyl)-5-ethylhydantoin,
1,3-di-(γ-aminopropyl)-5-isopropylhydantoin,
1,3-di-(γ-aminopropyl)-hydantoin,
1,3-di-(γ-aminopropyl)-5,5-pentamethylene-hydantoin,
(=1,3-di-(γ-aminopropyl)-1,3-diaza-spiro (4.5) decane-2,4-dione) and
1,3-di-(γ-aminopropyl)-5,5-tetramethylene-hydantoin
(=1,3-di-(γ-aminopropyl)-1,3-diaza-spiro (4.4) nonane-2,4-dione).

The diamino compounds of Formula II used as starting substances for the manufacture of the bicyclic amines according to the invention, of Formula I, can be employed both as pure colourless compounds and also in the form of a crude diamine (technical mixture), such as is obtained on hydrogenation of, for example, 1,3-di-(β-cyanoethyl)-5,5-dimethylhydantoin with hydrogen in the presence of a hydrogenation catalyst, such as Raney nickel or Raney cobalt. As a result of the presence of nickel or cobalt complex compounds such technical mixtures are coloured, and the practically pure, colourless diamine can be obtained therefrom by gentle distillation avoiding a premature elimination of water.

1 mol of water can be intramolecularly eliminated from the diamino compound of Formula II by heating, with the temperature having to be chosen to be sufficiently high for the intramolecular elimination of water to take place at all. To facilitate the removal of the intramolecularly eliminated water from the reaction mixture, the heating is preferably carried out under reduced pressure, whereby excessive heating, which can lead to undesired side-reactions, such as polycondensation, is simultaneously avoided. At the same time care must be taken that during the intramolecular elimination of water the pressure in the reaction vessel is only lowered to the point that at most small amounts of unchanged diamine distil from the reaction mixture, because otherwise losses would arise. It has proved advantageous to follow the elimination of water not only by weighing the amounts which are distilled off, but also to ascertain the progress of the elimination of water by continually taking samples from the reaction mixture and potentiometric titration of these samples. This is because the two amino groups in the mol of the diamino compound of Formula II can be titrated with HCl with a $p_{Ks}$-value of about 9.7 to 10. As the intramolecular elimination of water progresses, one amino group disappears and in its place appears a new buffer region with a $p_{Ks}$-value of about 6.7 to 7.2. The elimination of water is practically complete if on the one hand the HCl equivalents consumed for the amino group still present (having a $p_{Ks}$-value of about 10) and on the other hand the HCl equivalents consumed for the newly arisen base equiavlents bear an approximate ratio of 1:1 to one another. A so-called technical mixture is obtained, from which the pure bicyclic amine can be separated off by a crude fractional distillation.

Both the pure bicyclic amine and also the technical mixture can be used as curing agents for epoxide resins.

If such a technical mixture does not meet the requirements, for example as regards colour, a colourless product can be obtained therefrom by distillation under suitable conditions. During such a distillation, the individual fractions can again be tested potentiometrically and fractions which are unsatisfactory as regards the desired ratio of amino group equivalents to newly arisen base equivalents of 1.0:1.0 can be discarded.

In this way a practically analytically pure product of the particular bicyclic amine is obtained.

As initially mentioned, the new bicyclic amines of Formula I represent valuable curing agents for expoxide compounds.

A further subject of the present invention are hence curable mixtures which are suitable for the manufacture of mouldings, impregnations, coatings and adhesive bonds, and which are characterised in that they contain (a) a polyepoxide compound with an average of more than one epoxide group in the molecule and (b) as the curing agent, a bicyclic amine of formula

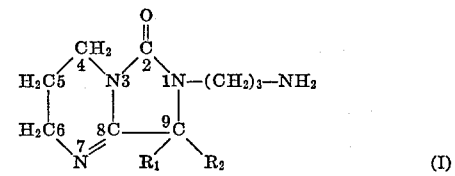

(I)

wherein $R_1$ and $R_2$ independently of one another each denote a hydrogen atom or an aliphatic or cycloaliphatic hydrocarbon radical, preferably a lower alkyl radical with 1 to 4 carbon atoms, or wherein $R_1$ and $R_2$ together form a divalent aliphatic or cycloaliphatic hydrocarbon radical, preferably a tetramethylene or pentamethylene radical.

Appropriately, 0.5 to 1.3 equivalents, preferably about 1.0 equivalent, of nitrogen-bonded active hydrogen atoms of the bicyclic amine of Formula I are used per 1 equivalent of epoxide groups of the polyepoxide compound (a).

Possible polyepoxide compounds (a) are above all those with an average of more than one glycidyl group, β-methylglycidyl group or 2,3-epoxycyclopentyl group bonded to a hetero-atom (for example sulphur, preferably oxygen or nitrogen); in particular, the following may be mentioned: bis(2,3-epoxycyclopentyl)ether; diglycidyl or polyglycidyl ethers of polyhydric aliphatic alcohols, such as 1,4-butanediol, or polyalkylene glycols, such as polypropylene glycols; diglycidyl or polyglycidyl ethers of cycloaliphatic polyols, such as 2,2-bis-(4'-hydroxycyclohexyl)propane; diglycidyl or polyglycidyl ethers of polyhydric phenols, such as resorcinol, bis-(p-hydroxyphenyl)methane, 2,2 - bis(p - hydroxyphenyl) propane (=diomethane), 2,2-bis(4'-hydroxy-3',5'-dibromophenyl)propane, 1,1,2,2-tetrakis-(p - hydroxyphenyl)-ethane, or condensation products of phenols with formaldehyde obtained under acid conditions, such as phenol novolacs and cresol novolacs; di- or poly-(β-methylglycidyl)-ethers of the abovementioned polyhydric alcohols or polyhydric phenols; polyglycidyl esters of polybasic carboxylic acids, such as phthalic acid, terephthalic acid, Δ⁴-tetrahydrophthalic acid and hexahydrophtalic acid; N-glycidyl derivatives of amines, amides and heterocyclic nitrogen bases, such as N,N-diglycidyl-aniline, N,N-diglycidyl-toluidine, N,N,N',N'-tetraglycidyl-bis(p - aminophenyl) - methane; triglycidyl-isocyanurate; N,N'-diglycidyl-ethyleneurea; N,N' - diglycidyl-5,5-dimethylhydantoin, N,N'-diglycidyl-5-isopropyl-hydrantoin; N,N'-diglycidyl-5,5-dimethyl-6-isopropyl-5,6-dihydro-uracil.

If desired, active diluents, such as, for example, styrene oxide, butyl glycidyl ether, isooctyl glycidyl ether, phenyl glycidyl ether, cresyl glycidyl ether and glycidyl esters of synthetic, highly branched, mainly tertiary aliphatic monocarboxylic acids ("CARDURA E") can be added to the polyepoxides to lower the viscosity.

The curing of the curable mixtures according to the invention to give mouldings and the like is appropriately carried out in the temperature range of 40 to 180° C., preferably at 120–160° C. The curing can also be carried out in two or more stages in a known manner, with the first curing stage being carried out at lower temperature (for example about 40° C.) and the post-curing at higher temperature (for example 160° C.).

The curing can, if desired, also be carried out in 2 stages by first prematurely stopping the curing reaction, or carrying out the first stage at room temperature or only slightly elevated temperature, whereby a precondensate which is still fusible and soluble, which is curable, and which has good storage stability at room temperature (so-called "B-stage") is obtained from the epoxide component (a) and the amine curing agent (b). Such a precondensate can, for example, serve for the manufacture of "prepregs," compression moulding compositions or especially sintering powders.

In order to shorten the gel times or curing times, known accelerators for the amine curing reaction, for example monophenols or polyphenols, such as phenol or diomethane, salicylic acid, tertiary amines or salts of thiocyanic acid, such as $NH_4SCN$, can be added.

The term "curing," as used here, denotes the conversion of the soluble, either liquid or fusible, polyepoxides into solid, insoluble and infusible, three-dimensionally crosslinked products or materials, and in particular, as a rule, with simultaneous shaping to give mouldings, such as castings, pressings, laminates and the like or "two-dimensional structures" such as coatings, lacquer films or adhesive bonds.

The curable mixtures, according to the invention, of polyepoxide compounds (a) and the bicyclic amines of Formula I as curing agents (b) can furthermore, in any stage before curing, be mixed with customary modifiers, such as extenders, fillers and reinforcing agents, pigments, dyestuffs, organic solvents, plasticisers, flow control agents, agents for conferring thixotropy, flameproofing substances or mould release agents.

As extenders, reinforcing agents, fillers and pigments which can be employed in the curable mixtures according to the invention, there may for example be mentioned; coal tar, bitumen, textile fibre, glass fibres, asbestos fibres, boron fibres, carbon fibres, cellulose, polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel ("AEROSIL"), lithopone, barytes, titanium dioxide, carbon black, graphite, oxide colours, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures it is for example possible to use dibutyl, dioctyl, and dinonyl phthalate, tricresyl phosphate, trixylenyl phosphate and also polypropylene glycols.

As flow control agents when using the cruable mixtures, especially in surface protection, it is for example possible to add silicones, cellulose acetobutyrate, polyvinyl butyral, waxes, stearates and the like (which are in part also used as mould release agents).

Especially for use in the lacquer field, the polyepoxide compounds can furthermore be partially esterified in a known manner with carboxylic acids, such as especially higher unsaturated fatty acids. It is furthermore possible to add other curable synthetic resins, for example phenoplastics or aminoplastics, to such lacquer resin formulations.

The cruable mixtures according to the invention can be manufactured in the customary manner with the aid of known mixing apparatuses (stirrers, kneaders, rolls and the like).

The cruable epoxide resin mixtures according to the invention are above all employed in the fields of surface protection, the electrical industry and laminating processes, and in the building industry. They can be used in a formulation suited in each case to the special end use, in the unfilled or state, optionally in the form of solutions or emulsions, as paints, lacquers, as sintering powders, compression moulding compositions, injection moulding formulation, dipping resins, casting resins, impregnating resins, binders and adhesives, as tool resins, laminating resins, sealing and filling compositions, floor covering compositions and binders for mineral aggregates.

In the examples which follow parts denote parts by weight and percentages denote percentages by weight, unless otherwise indicated. The relationship of parts by volume to parts by weight is as of the millilitre to the gram.

The diamino compounds of Formula II used as startings substances in the examples which follow were manufactured as follows:

(a) Manufacture of 1,3-di-(γ-aminopropyl)-5,5-dimethylhydantoin

The crude diamine from 1,3-di-(γ-aminopropyl)-5,5-dimethylhydantoin employed in Example 1 below is obtained by catalytic hydrogenation of 1,3-di-(β-cyanoethyl)-5,5-dimethylhydantoin with Raney nickel in alcohol saturated with $NH_3$ gas, with the hydrogenation having to be carried out in an autoclave at about 100° C. and at a total pressure of about 125 atmospheres until the pressure remains practically constant for about 1 hour after repeated injection of hydrogen.

After cooling, the excess pressure is released, the catalyst is filtered off, and volatile constituents are first of all removed from the filtrate under a waterpump vacuum up to about 80° C. bath temperature (if necessary, finally also under a high vacuum, at about 0.05 mm. Hg, at the same bath temperature) on a rotary evaporator.

A slightly viscous product which is coloured blue by nickel complex compounds but is otherwise clear, and which on the basis of the potentiometric titration is an approximately 95% pure crude diamine, is obtained.

This crude diamine can be distilled on a thin layer evaporator at a pressure of about 0.001 mm. Hg and at a column temperature of 160° C. A water-clear, slightly viscous distillate is obtained, which is practically pure 1,3-di-(γ-aminopropyl)-5,5-dimethylhydantoin. The $p_{KS}$-value is about 9.7.

(b) Manufacture of 1,3-di-(γ-aminopropyl)-5,5--ethyl-5-methylhydantoin

The 1,3-di-(γ-aminopropyl)-5-ethyl-5-methylhydantoin employed in Example 2 below can be obtained by hydrogenation of 1,3-di-(β-cyanoethyl)-5-ethyl-5-methylhydantoin in an analogous manner to that described for the manufacture of 1,3-di-(γ-aminopropyl)-5,5-dimethylhydantoin.

The resulting blue crude diamine of 1,3-di-(γ-aminopropyl)-5-ethyl-5-methylhydantoin is further purified by distillation at a pressure of 0.1 to 0.2 mm. Hg (boiling range 176 to 178° C.). Colourless 96% pure 1,3-di-(γ-aminopropyl)-5-ethyl-5-methylhydantoin is obtained and this is employed for the intramolecular elimination of water.

(c) Manufacture of 1,3-di-(γ-aminopropyl)-5,5-tetramethylenehydantoin

The crude product of 1,3-di-(γ-aminopropyl)-5,5-tetramethylenehydantoin employed in Example 3A below can be obtained by hydrogenation of 1,3-di-(β-cyanoethyl)-5,5-tetramethylene hydantoin in an analogous manner to that described for the manufacture of 1,3-di-(γ-aminopropyl)-5,5-dimethylhydantoin. The blue-coloured product contains 7.23 $NH_2$ equivalents/kg. The corresponding colourless diamine employed in Example 3B is obtained by distillation of 360 g. of crude diamine on a thin layer evaporator at a column temperature of about 200° C. and under a pressure of about 0.25 mm. Hg. The 290 g. of distillate contain 7.36 $NH_2$ equivalents/kg. (98.8% of theory).

(d) Manufacture of 1,3-di-(γ-aminopropyl)-5-isopropylhydantoin

The 1,3-di-(γ-aminopropyl)-5-isopropylhydantoin employed in Example 4, which has been subjected to a thin layer distillation, is obtained from 1,3-di-(β-cyanoethyl)-5-isopropylhydantoin by hydrogenation in an analogous manner to that described for the manufacture of 1,3-di-(γ-aminopropyl)-5,5-dimethylhydantoin, though with the difference that after isolation of the crude diamine the latter is distilled on a thin layer evaporator at a column temperature of about 200° C. and at a pressure of about 0.5 mm Hg. Colourless 1,3-di-(γ-aminopropyl)-5-isopropylhydantoin containing 7.65 $NH_2$ equivalents/kg. (98.1% of theory) is thereby obtained.

The following epoxide resins were used for the manufacture of curable mixtures described in the Use Examples:

Epoxide Resin A

Polyglycidyl ether resin (technical product) which is liquid at room temperature, manufactured by condensation of diomethane (2,2-bis(p-hydroxyphenyl)-propane) with a stoichiometric excess of epichlorhydrin in the presence of alkali, mainly consisting of diomethane-diglycidyl ether of formula

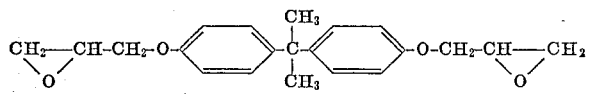

and having the following characteristics:

Epoxide content: 5.1 to 5.6 epoxide equivalents/kg.
Viscosity (Hoeppler) at 25° C.: 9000 to 13,000 cp.

Epoxide Resin B

Polyglycidyl ether resin which is viscous at room temperature, manufactured by condensation of diomethane (2,2-bis(p-hydroxyphenyl)-propane) wtih a stoichiometric excess of β-methylepichlorohydrin in the presence of alkali and mainly consisting of diomethane-diglycidyl ether of formula

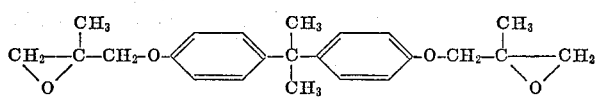

having the following characteristics:

Epoxide content: 4.5 epoxide equivalents/kg.
Viscosity (Hoeppler) at 25° C.: 120,000 cp.
Content of hydrolysable chlorine: 0.1%.

Epoxide Resin C

N,N'-diglycidyl-5,5-dimethylhydantoin manufactured by condensation of 5,5-dimethylhydantoin with a stoichiometric excess of epichlorhydrin in the presence of alkali, having the following characteristics:

Epoxide content: 8 epoxide equivalents/kg.
Viscosity (Hoeppler) at 25° C.: 1240 cp.

To determine the mechanical properties of the cured products manufactured from the curable mixtures described in examples which follow, castings of dimensions 140 x 43 x 13 mm. were manufactured for determining the flexural strength, deflection, impact strength and water absorption. The test specimens (60 x 10 x 4 mm.) for the determination of the water absorption and for the flexural and flexural impact test (VSM 77,103 and VSM 77,105 respectively), as well as the test specimens (120 x 15 x 10 mm.) for the determination of the heat distortion point according to Martens (DIN 53,458) were mechanically machined from the casting.

EXAMPLE 1

A ½ litre flask provided with an internal thermometer, boiling capillary, Claisen attachment with distillation thermometer, and descending condenser with receiver, serves as the reaction vessel. An oil bath (up to 250° C.) provides the heating. 435 g. of crude diamine of 1,3-di-(γ-aminopropyl)-5,5-dimethylhydantoin are heated in the reaction vessel from room temperature to about 160° C. over the course of about 30 minutes, initially under a pressure of about 40 mm. Hg. The reaction mixture is brought from about 160° C. to about 220° C. over the course of about 1 hour whilst continuously worsening the vacuum from about 40 mm. Hg to about 120 mm. Hg, so that the distillation temperature does not exceed about 100° C., whereby premature distillation of unchanged diamine can largely be prevented. During this time practically the entire amount of the water eliminated intramolecularly by heating has distilled off and has collected in the receiver together with small amounts of higher-boiling products. The contents of the receiver are discarded.

A further 5 g. of distillate are now obtained at an internal temperature dropping from about 220° C. (70 mm. Hg) to about 205° C. (14 mm. Hg) and a distillation temperature rising to about 190° C.; this distillate is also discarded.

The residue in the flask is a technical mixture which contains 1-(γ-aminopropyl) - 9,9 - dimethyl-1,3,7-triaza-bicyclo[4.3.0]non(7)en-2-one. This technical mixture can be employed as a curing agent for epoxide compounds. According to potentiometric titration, converted to a weighed-out amount of 224.30 g. (1 mol), the technical mixture contains a total of 1.84 base equivalents, of which 0.934 are present in the form of $NH_2$ groups and 0.909 in the form of base equivalents which have newly arisen as a result of the elimination of water.

In order to separate the 1-(γ-aminopropyl)-9,9-dimethyl-1,3,7-triaza-bicyclo[4.3.0]non(7)en - 2 - one from the technical mixture mentioned, the latter is distilled at an internal temperature of about 205° C. to about 230° C. and at a distillation temperature of 195° C. to about 190° C., at a pressure of about 10 mm. Hg; 319 g. of the practically pure, colourless, clear compound according to the invention, which is slightly viscous at room temperature, are obtained over the course of 1 hour. The residue in the flask amounts to 81 g. and is discarded.

In order to characterise the compound more closely, it was potentiometrically titrated with HCl in aqueous solution. Converted to a weighed-out amount of 224.30 g. (1 mol), a total of 1.98 base equivalents were found of which 1.0 base equivalent has a $p_{KS}$-value of 9.7 and 0.98 base equivalent has a $p_{KS}$-value of 6.8. The product is about 99% pure.

*Combustion analysis.*—Calcd. for $C_{11}H_{20}N_4O_1$ (percent): (molecular weight, 224.30). C, 58.90; H, 8.99, N, 24.98. Found (percent): C, 58.94; H, 8.83; N, 24.79.

EXAMPLE 2

A 150 ml. pointed flask, provided with an internal thermometer, boiling capillary, Claisen attachment with boiling thermometer and descending condenser, to which an adapter with replaceable receivers is attached, serves as the reaction apparatus for 98 g. of 1,3-di-(γ-aminopropyl)-5-methyl-5-ethyl-hydantoin.

The bath temperature is brought to 220° C. over the course of 45 minutes at a pressure of 200 mm. Hg, in the course of which the internal temperature rises to 206° C. and the boiling temperature to 60° C. The pressure is lowered to 150 mm. Hg over the course of 2 hours and 40 minutes at constant bath temperature, and is not changed further until the end of the intramolecular elimination of water is reached; in the course thereof, the internal temperature rises to 215° C. and the boiling temperature fluctuates between 60° C. and 67° C. After a further 35 minutes' heating under the conditions mentioned, a potentiometrically titrated sample of the reaction mixture shows that the elimination of water has proceeded about half-way. The bath temperature is raised to 230° C. and maintained for a further 2 hours 10 minutes; in the course thereof, the internal temperature rises to 225° C. and the reaction has taken place to the extent of 75%. The bath temperature is raised to 240° C. and maintained for 1 hour 30 minutes. From the potentiometric titration of a sample of the reaction mixture it is possible to conclude that whilst the elimination of water has proceeded further, the occurrence of undesired by-products already begins to manifest itself, and for this reason the reaction is stopped and a distillation from the same apparatus is carried out at a pressure of 10 mm. Hg.

Result of the distillation 98 g. of 96% pure diamine were employed for the intramolecular elimination of water, corresponding to 96 g. of 100% pure diamine or 0.375 mol.

The yield is 52% of pure 1-(γ-aminopropyl)-9-methyl-9-ethyl-1,3,7-triaza-bicyclo[4.3.0]non(7)en-2-one.

*Combustion analysis.*—Calcd. for $C_{12}H_{22}N_4O_1$ (percent): (molecular weight, 238.33). C, 60.47; H, 9.30; N, 23.51; O, 6.71. Found (percent): C, 60.66; H, 9.51; N, 23.57, O, 6.75.

EXAMPLE 3A

Water is intramolecularly eliminated by heating under reduced pressure from 30 g. of crude diamine of 1,3-di-(γ-aminopropyl)-5,5-tetramethylenehydantoin, in the apparatus described in Example 2.

The progress of the elimination of water is followed by withdrawing samples from the reaction flask and potentiometric titration of the samples. The elimination of water is stopped as soon as the occurrence of undesired by-product begins to show itself in the titration. The residue in the flask amounts to 26 g. and is the technical mixture, according to the invention of 1-(γ-aminopropyl-9,9-tetramethylene-1,3,7-triaza - bicyclo[4.3.0]-non-(7)-en-2-one.

EXAMPLE 3B

The elimination of water from 186 g. of the colourless 1,3-di-(γ-aminopropyl) - 5,5 - tetramethylenehydantoin which has been subjected to thin layer distillation is carried out using a 250 ml. flask which is equipped with an internal thermometer, boiling capillary, Vigreux column with distillation thermometer, and descending condenser with adapter and receiver. The pressure in the reaction appparatus is first set to about 40 mm. Hg. The bath temperature is brought to 230° C. and is kept constant during the entire duration of the reaction (7½ hours after reaching the bath temperature of 230° C.). The internal temperature is 225°–227° C.; the distillation temperature is about 30°–40° C. After a reaction duration of 1¼ hours the pressure is lowered to about 14 mm. Hg and is not changed again up to the end of the reaction. The progress of the reaction is followed by withdrawing samples from the reaction mixture and titration of these samples. When by-products arise, which shows itself through the indication of a new buffer region (pH 4–5) in the titration curve, the reaction is stopped. 169 g. of (yellow-coloured) 1-(γ-aminopropyl)-9,9-tetramethylene - 1,3,7 - triaza-bicyclo-[4.3.0]-non-(7)-en-2-one are obtained. After distilling 164 g. of this product on a thin layer evaporator at a column temperature of 200° C. and at a pressure of 0.25 mm. Hg, 149 g. of the product, which is now colourless, are obtained.

EXAMPLE 4

The arrangement described in Example 3B, with the difference that a 500 ml. flask is now used, serves as the apparatus for the elimination of water from 410 g. of 1,3-di-(γ-aminopropyl) - 5 - isopropylhydantoin with 7.65 $NH_2$-equivalents/kg. (98.1% of theory). After a heating time of about 45 minutes; the bath temperature is 230° C.; it is not changed again during the entire duration of the reaction; the internal temperature is 221° C., the distillation temperature is about 40° C., and the pressure, which is gradually lowered to about 18 mm. Hg over the course of the further reaction, is set to 25 mm. Hg; the slow distillation of water has already started. 375 g. of 1-(γ-aminopropyl) - 9 - isopropyl - 1,3,7 - triaza-bicyclo [4.3.0]-non-(7)-en-2-one with 4.03 $NH_2$-equivalents/kg. and 3.98 base-equivalents produced/kg. are obtained.

EXAMPLE 5

The apparatus described in Example 3B is used for the elimination of water from 3380 g. of practically pure 1,3-di-(γ-aminopropyl) - 5,5 - dimethylhydantoin, containing 8.15 $NH_2$-equivalents/kg., which has been subjected to thin layer distillation. The bath temperature is brought to 230° C. over the course of about 1½ hours at a pressure of about 40 mm. Hg and is kept constant over the further course of the reaction. When the distillation temperature rises, steps are taken, by adjusting the pressure to about 100 mm. Hg, that the distillation temperature does not significantly exceed about 100° C. As soon as the elimination of water slows down, which is recognisable by the drop in the distillation temperature, the pressure can again be lowered to about 40 mm. Hg; the distillation temperature is 50–60° C. After 6½ hours, calculated from when the bath temperature of 230° C. is reached, the elimination of water is for practical purposes complete. 3082 g. of the liquid 1-(γ-aminopropyl)-9,9-dimethyl - 1,3,7-triaza-bicyclo[4.3.0]-non - (7) - en-2-one, which is still slightly yellow, are obtained, with 4.45 $NH_2$-equivalents/kg. and a $p_{Ks}$-value of 9.9 and with 4.23 base-equivalents freshly formed as a result of the elimination of water and a $p_{Ks}$-value of 6.9.

USE EXAMPLES

EXAMPLE I (a) 100 g. of epoxide resin A (liquid diomethanediglycidyl ether with an epoxide content of 5.25 epoxide equivalents/kg. and a viscosity of about 9500 cp. at 25° C.) are carefully mixed with 40 g. of pure 1-(γ-aminopropyl) - 9,9 - dimethyl-1,,7-triaza-bicyclo[4.3.0]non(7) en-2-one containing a total of 8.9 base-equivalents/kg. (corresponding to a ratio of equivalents of epoxide groups to equivalents of active hydrogen atoms bonded to nitrogen=3:2) in a vessel kept at 40° C. The mixture is poured into a thin-walled aluminium mould (about 140 x 43 x 13 mm.) warmed to 40° C. and is stored for 5 hours at 80° C. in a heated cabinet.

The test specimens showed the following properties:

Flexural strength (VSM 77,103): 13.8 kg./mm.$^2$
Deflection (VSM 77,103): 15.1 mm.
Flexural impact strength (VSM 77,105): 14.2 cm. kg./cm.$^2$
Heat distortion point according to Martens (DIN 53,458): 79° C.
Water absorption after 1 hour's storage in boiling water: 1.3%

(b) The procedure of the above Example I(a) is followed, with the difference that instead of the 40 g. of pure 1-(γ-aminopropyl) - 9,9 - dimethyl - 1,3,7 - triaza-bicyclo-[4.3.0]-non-(7)-en-2-one 43 g. of the technical product containing a total of 8.2 base-equivalents/kg. (corresponding to a ratio of equivalents of epoxide groups to equivalents of nitrogen-bonded active hydrogen atoms=3:2) are used.

Two castings are manufactured and both samples (as in Example I(a)) are warmed to 80° C. for 5 hours; both samples are kept at 120° C. for a further 2 hours. Sample I is removed from the heating cabinet, whilst sample II is warmed to 180° C. for a further hour. The test specimens machined from the two cured castings show the following properties:

|  | Sample I | Sample II |
| --- | --- | --- |
| Flexural strength (VSM 77,103), kg./mm.$^2$ | 17.8 | 17.4 |
| Deflection (VSM 77,103), mm | 10.5 | 9.3 |
| Flexural impact strength (VSM 77,105), cm. kg./cm.$^2$ | 10-13 | 40-50 |
| Heat distortion point according to Martens (DIN 53,458),° C | 100 | 100 |
| Water absorption after 1 hour's storage in boiling water, percent | 1.2 | 1.1 |

EXAMPLE II 100 g. of epoxide resin A are used as in Use Example I. 43 g. of 1-(γ-aminopropyl)-9-methyl-9-ethyl-1,3,7-triaza-bicyclo[4.3.0]non-(7)en-2-one according to Example 2, containing a total of 8.4 base-equivalents/kg. (corresponding to a ratio of equivalents of epoxide groups to equivalents of nitrogen-bonded active hydrogen atoms=3:2) are used as the curing agent, and the procedure of the 1st Use Example is followed. The casting obtained after 5 hours' warming to 80° C. is subsequently (without removal from the mould) further warmed to 120° C. for 2 hours and to 180° C. for 1 hour. The test specimens machined from the casting show the following properties:

Flexural strength (VSM 77,103): 15.4 kg./mm.$^2$
Deflection (VSM 77,103): 11.3 mm.
Flexural impact strength (VSM 77,105): 21 to 25 cm. kg./cm.$^2$
Heat distortion point according to Martens (DIN 53458): 100° C.
Water absorption after 1 hour's storage in boiling water: 1%

EXAMPLE III (a) Formation, stability and reactivity of a solid hot-curing B-stage resin 1000 g. of epoxide resin A with an epoxide content of 5.15 epoxide equivalents/kg. were homogeneously mixed with 400 g. of 1-(γ-aminopropyl)-9,9-dimethyl-1,3,7-triaza-bicyclo[4.3.0]non(7)en-2-one and 11.5 g. of a flow control agent based on silicone by stirring at room temperature and subsequently left to stand at room temperature, in relatively thin layers, for 12 to 24 hours. After this time, a hard, brittle, easily grindable precondensate (stable B-stage resin) has formed from the components, this material being suitable for the formulation of hot-curing epoxide resin powders which are resistant to arcing.

The B-stage resin has a softening and melting range of 63 to 75° C. (according to Kofler) and an epoxide and amine titration value of 3.77 equivalents/kg. This titration value was obtained according to the method of epoxy titration in an anhydrous solvent according to R. R. Jay, Analyt. Chemistry, vol. 36, March 1964, page 669. Of course, basic groups are also titrated at the same time by this method. Since the amine curing agent gives a very rapid pre-reaction with the liquid epoxide resin at room temperature, the equivalent value of the sum of basic groups and epoxide groups of the starting mixture was calculated to be 8.72, relative to the total weight (1400 g.) of the resin-curing agent mixture (1000 g. of epoxide resin A ≙ 5.15 epoxide equivalents; 400 g. of 1-(γ-aminopropyl) - 9,9 - dimethyl - 1,3,7-triaza-bicyclo[4.3.0]non (7)en-2-one ≙ 3.57 total base-equivalents), corresponding to a value of 6.2 epoxide and total base-equivalents/kg. After leaving the starting mixture to stand at room temperature for 24 hours, this value drops to 3.77 equivalents/kg., to the epoxide and amine titration value of the stable B-stage resin.

The stability of the B-stage resin was followed, after several hours' or several days' storage of the B-stage resin at room temperature or at 42° C., through the change with time of the titration value of epoxide and total base-equivalents/kg. and also through the reactivity measured from the half-life (time for the exothermic effect to have subsided to half its value) at 200° C. isothermally by means of the "Differential Scanning Calorimeter" (D.S.C.). The results of the measurements are summarised in Table 1.

TABLE 1.—STABILITY OF THE B-STAGE RESIN

|  | Starting mixture | B-stage resin | | |
| --- | --- | --- | --- | --- |
|  |  | After 24 hours' storage at room temperature | After 4 weeks' storage at room temperature | After 1 week's storage at 42° C. |
| Epoxide and total base-equivalents (equiv./kg.) | 6.2 | 3.77 | 3.69 | 3.77 |
| Half-life, D.S.C. (mins.) | | 2 | | 2 |

The reactivity of the B-stage resin was determined by means of the gel time, measured in a test tube in a thermostatically controlled oil bath (amount of resin weighed out: 5 g.) as the time at which a glass rod dipping into the resin/curing agent mixture can no longer (or only with difficulty) be moved up and down. Test tube dimensions: length 140 mm., internal diameter 14 mm., glass thickness about 0.6 mm.

As further emerges from the table which follows, the reactivity of the B-stage resin (measured through the gel time at 180° C.) can be significantly increased further by typical amine accelerators such as, for example, imidazole and its derivatives, for certain applications of hot curing.

TABLE 2.—REACTIVITY OF THE B-STAGE RESIN

| B-stage resin, parts | 5 | 5 | 5 |
| --- | --- | --- | --- |
| I-midazole, part | | 0.05 | |
| 1-methylimidazole, parts | | | 0.05 |
| Gel time at 180° C. seconds | 235 | 112 | 116 |

(b) Manufacture, application and properties of an epoxide resin powder formulated on the basis of a B-stage resin according to Example IIIa The following batch was prepared:

|  | Parts |
| --- | --- |
| B-stage resin according to Example IIIa | 500 |
| Quartz powder | 300 |
| Chromium oxide green pigment | 10 |
| Silica aerosol (registered trademark "Aerosil" of Messers. Degussa) | 10 |

The constituents of the formulation were thoroughly mixed dry for 2 hours in a mixing vessel (ball mill) with the aid of some porcelain balls and were perfectly homogenised by means of a continuously working kneader at 80° C. jacket temperature. The cooled, solidified homogeneous mixture was first coarsely ground and then finely ground. Thereafter the portions of the particles which were above 100μ were separated off by means of a sieve.

The resulting epoxide resin powder (particle size <100 μ) showed the following properties:

Gel time at 180° C.: 180 seconds.
Softening point/melting point (Kofler): 68/78° C.
Half-life (D.S.C.): 94 seconds.

In this case, the gel time was determined in accordance with the following internal test method:

An electrical heating plate (diameter 115 mm., of Messrs. Electro-Physik, Cologne) was set to the test temperature of 180° C. The temperature was measured by means of a laterally introduced probe of a thermocouple (Seconds Thermometer, Messrs. Quartz A. G., Zurich). The temperature constancy was ±2° C.

About 0.5 g. of test material was placed on the plate with a timer (stopwatch) being switched on simultaneously, and the molten material was then uniformly moved to and fro with a spatula. As the curing progresses, the viscosity beings to increase. The spatula is now periodically lifted and the formation of threads observed.

The point in time at which the formation of thread suddenly collapses and the material gels to give a coherent layer is the end point of the measurement and the time is recorded. The time thus measured is quoted as the gel time in seconds.

Using the epoxide resin powder obtained above, coatings were manufactured with an electrostatic spraying installation of Messrs. Sames. The powder was applied to cold, sand-blasted, degreased iron sheets of size 70 x 150 x 0.8 mm. and was stoved at 180° C.

The following mechanical values were measured: deep drawing value according to Erichsen (according to DIN 53,156, film thickness 55–75μ)

|  | Mm. |
|---|---|
| After 30 minutes' stoving time | 5.4 |
| After 40 minutes' stoving time | 5.5 |
| After 50 minutes' stoving time | 5.6 |
| After 60 minutes' stoving time | 5.8 |

By way of comparison, an epoxide resin sintering powder with dicyandiamide as the curing agent showed a deep drawing value according to Erichsen of 6.7 mm. at a film thickness of about 110μ and a stoving temperature of 180° C. after 40 minutes, and a deep drawing value according to Erichsen of 7.0 mm. after 60 minutes. The epoxide resin sintering powder had the following composition:

| | Parts |
|---|---|
| Liquid bisphenol A-polyglycidyl ether resin with 5.15 epoxide equivalents/kg. | 5.09 |
| Solid bisphenol A-polyglycidyl ether resin with 2.10 epoxide equivalents/kg. | 22.40 |
| Solid bisphenol A-polyglycidyl ether resin with 0.55 epoxide equivalents/kg. | 35.35 |
| Fillers and pigments | 32.68 |
| Polyvinylbutyral (flow control agent) (registered trademark "MOWITAL B60H") | 1.00 |
| Polyethylene powder | 0.30 |
| Silica aerogel (agent for conferring thixotropy) (registered trademark "Aerosil") | 0.71 |
| Dicyandiamide | 2.47 |

To determine the arcing resistance, 4 to 5 mm. thick sheets with a diameter of 85 mm. were manufactured from the epoxide resin powder according to Example IIIb by sintering at 180° C. The measurement gave the following value (according to DIN 53,484):

Arcing resistance (level): $L_4$

By way of comparisons, the sheets manufactured under identical conditions from the epoxide resin sintering powder and dicyandiamide as the curing agent showed an arcing resistance of level $L_1$.

To determine the heat distortion point of the cured B-stage resin, the transition range was measured, using the "Differential Scanning Calorimeter" (D.S.C.) on castings which were cured for 1 hour at 180° C.

Transition range (D.S.C.): 126° C.

By way of comparison, a casting manufactured from the epoxide resin sintering powder, which contained dicyandiamide as the curing agent and was otherwise cured under the same conditions, showed a transition range (D.S.C.) of 98 to 99° C.

EXAMPLE IV 100 g. of epoxide resin A with an epoxide content of 5.4 equivalents/kg. were prewarmed to about 60–80° C. and homogeneously mixed at this temperature with 41.1 g. of 1-(γ-aminopropyl)-9,9-dimethyl-1,3,7 - triazabicyclo [4.3.0]non-(7)-en-2-one manufactured according to Example 5. The resin-curing agent mixture was then freed of included air bubbles by a vacuum treatment and poured into aluminium moulds prewarmed to 140° C. in order to manufacture shaped articles. After a heat treatment of 16 hours at 140° C., the shaped articles machined from the castings showed the following properties:

Flexural strength (VSM 77,103): 13.21 kg./mm.$^2$
Deflection (VSM 77,103): 17.9 mm.
Flexural impact strength (VSM 77,105): 91.19 cm.kg./cm.$^2$
Heat distortion point (DIN 53,461): 105.7° C.
Tensile strength (DIN 53,455): 8.71 kg./mm.$^2$
Elongation at break (DIN 53,455): 7.3%
Weight increase after 1 day's storage in water at 20° C.: 0.16%

EXAMPLE V 100 g. of epoxide resin B with an epoxide content of 4.5 equivalents/kg. were prewarmed to about 60°–80° C. and homogeneously mixed at this temperature with 34 g. of 1-(γ-aminopropyl)-9,9-dimethyl - 1,3,7 - triazabicyclo-[4.3.0]-non-(7)-en-2-one, manufactured according to Example 5. The resin-curing agent mixture was then freed of included air bubbles by a vacuum treatment and poured into aluminium moulds prewarmed to 80° C. in order to manufacture shaped articles. After a heat treatment of 4 hours at 80° C. and 12 hours at 140° C., the shaped articles machined from the castings showed the following properties:

Flexural strength (VSM 77,103): 11.27 kg./mm.$^2$
Deflection (VSM 77,103): 4.4 mm.
Flexural impact strength (VSM 77,105) 10.63 cm.kg./cm.$^2$
Heat distortion point (DIN 53,461): 99° C.
Tensile strength (DIN 53,455): 4.71 kg./mm.$^2$
Elongation at break (DIN 53,455): 2.9%
Weight increase after 1 day's storage in water at 20° C.: 0.15%

EXAMPLE VI 100 g. of epoxide resin C with an epoxide content of 8 equivalents/kg. were prewarmed to about 60°–80° C. and homogeneously mixed at this temperature with 64.9 g. of 1-(γ-aminopropyl)-9,9-dimethyl-1,3,7-triazabicyclo-[4.3.0]-non-(7)-en-2-one, manufactured according to Example 5. The resin-curing agent mixture was then freed of included air bubbles by a vacuum treatment and poured into aluminium moulds prewarmed to 80° C. in order to manufacture shaped articles. After a heat treatment of 24 hours at 40° C. and 12 hours at 140° C. the shaped articles machined from the castings showed the following properties:

Flexural strength (VSM 77,103): 14.6 kg./mm.$^2$
Deflection (VSM 77,103): 14.9 mm.
Flexural impact strength (VSM 77,105): 10.7 cm.kg./cm.$^2$
Heat distortion point according to Martens (DIN 53,458): 135° C.

EXAMPLE VII 100 g. of epoxide resin A with an epoxide content of 5.4 equivalents/kg. were prewarmed to about 60°–80° C. and homogeneously mixed at this temperature with 46.1 g. of 1 - (γ-aminopropyl) - 9,9 - tetramethylene-1,3,7-triazabicyclo-[4.3.0]-non-(7)-en-2-one manufactured according to Example 3B. The resin-curing agent mixture was then freed of included air bubbles by a vacuum treatment and poured into aluminium moulds, prewarmed to 80° C., in order to manufacture shaped articles. After a heat treatment of 4 hours at 80° C. and 12 hours at 140° C. the shaped articles machined from the castings showed the following properties:

Flexural strength (VSM 77,103): 14.23 kg./mm.²
Deflection (VSM 77,103): 14.0 mm.
Flexural impact strength (VSM 77,105): 41.31 cm.kg/cm.²
Heat distortion point (DIN 53,461): 36.6° C.
Tensile strength (DIN 53,455): 9.2 kg./mm.²
Elongation at break (DIN 53,455): 6.7%
Weight increase after 1 day's storage in water at 20° C.: 0.14%

EXAMPLE VIII 100 g. of epoxide resin A with an epoxide content of 5.3 equivalents/kg. were prewarmed to about 60°–80° C. and homogeneously mixed at this temperature with 43.5 g. of 1-(γ-aminopropyl)-9-isopropyl-1,3,7-triazabicyclo-[4.3.0]-non-(7)-en-2-one manufactured according to Example 4. The resin-curing agent mixture was then freed of included air bubbles by a vacuum treatment and poured into aluminium moulds, prewarmed to 80° C., in order to manufacture shaped articles. After a heat treatment of 5 hours at 80° C. and 1 hour at 150° C. the shaped articles machined from the castings showed the following properties:

Flexural strength (VSM 77,103): 13.83 kg./mm.²
Deflection (VSM 77,103): 15.5 mm.
Flexural impact strength (VSM 77,105): 72.50 cm.kg./cm.²
Heat distortion point according to Martens (DIN 53,458): 108° C.

We claim:
1. A bicyclic amine of formula

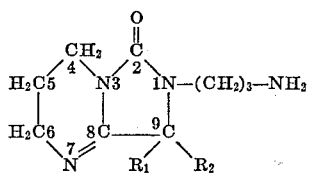

wherein $R_1$ and $R_2$ each represents a member selected from the group consisting of a hydrogen atom, alkyl with 1 to 4 carbon atoms, alkenyl with 1 to 4 carbon atoms, cyclohexyl, cyclohexenyl and phenyl, or wherein $R_1$ and $R_2$ together form a divalent residue selected from the group consisting of tetramethylene residue and pentamethylene residue.

2. 1 - (γ-aminopropyl)-9,9-dimethyl-1,3,7-triazabicyclo[4.3.0]non(7)en-2-one.

3. 1 - (γ-aminopropyl)-9-methyl-9-ethyl-1,3,7-triazabicyclo[4.3.0]non(7)en-2-one.

4. 1 - (γ-aminopropyl)-9,9-tetramethylene-1,3,7-triazabicyclo[4.3.0]non(7)en-2-one.

5. 1 - (γ-aminopropyl) - 9 - isopropyl-1,3,7-triazabicyclo[4.3.0]non(7)en-2-one.

References Cited
UNITED STATES PATENTS 3,558,618    1/1971    Trepanier _____ 260—256.4 E ALEX MAZEL, Primary Examiner R. J. GALLAGHER, Assistant Examiner U.S. Cl. X.R.

260—2 EP, 301.5

UNITED STATES PATENT OFFICE CASE 6771/E
CERTIFICATE OF CORRECTION

Patent No. 3,651,062          Dated March 21, 1972

Inventor(s) WILLY FATZER ET AL

It is certified that error appears in the above-identified patent and that said Letters Patent are hereby corrected as shown below:

Column 1, line 6, after "Switzerland" insert --- assignors to Ciba-Geigy AG, Basel, Switzerland ---.

Signed and sealed this 6th day of August 1974.

(SEAL)
Attest:

McCOY M. GIBSON, JR.        C. MARSHALL DANN
Attesting Officer            Commissioner of Patents

PO-1050 (5/69)